Feb. 23, 1971          L. L. MARTIN          3,564,728

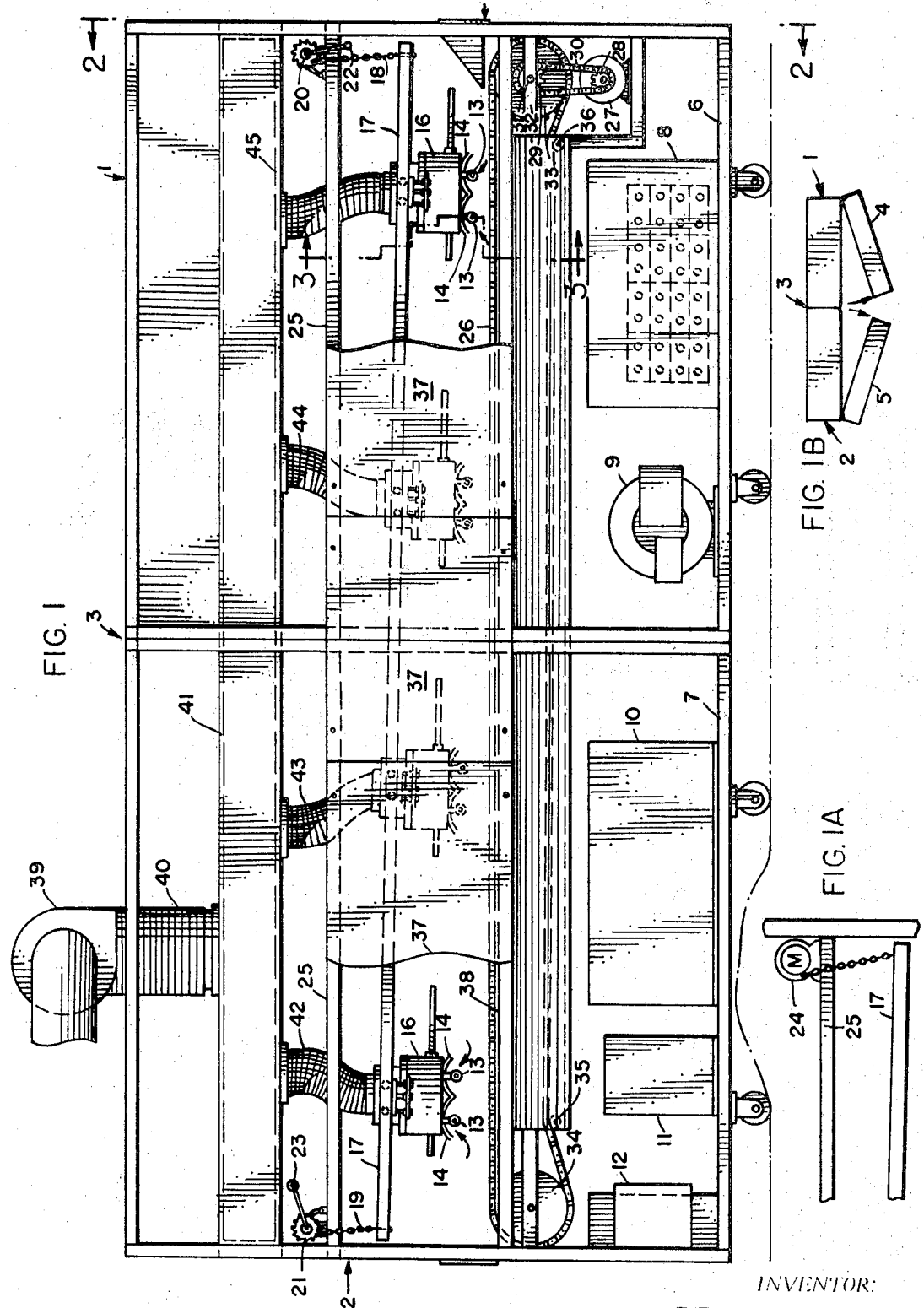
INVENTOR:
LARRY L. MARTIN

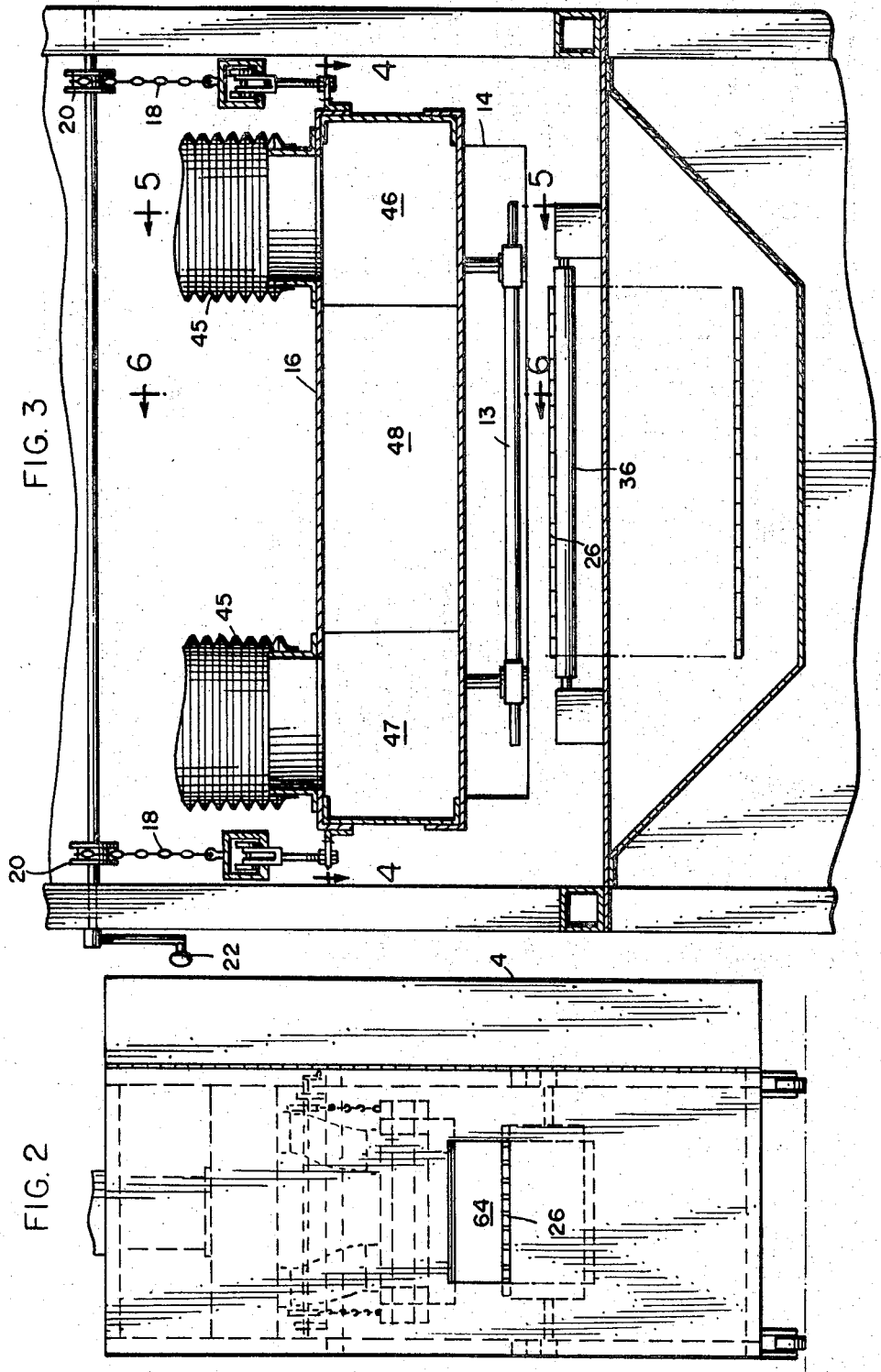

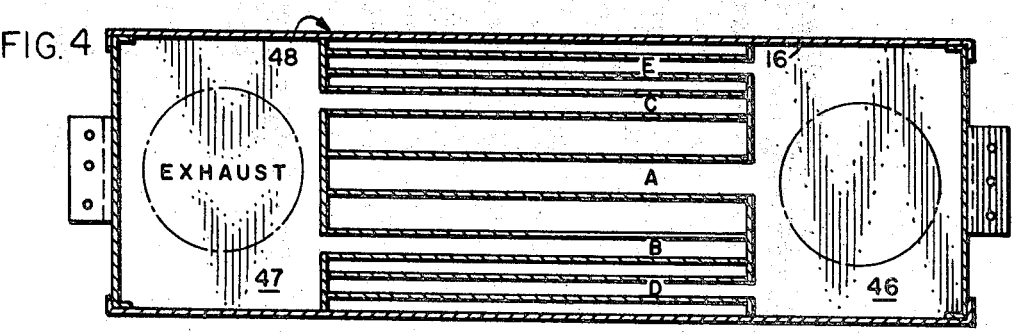
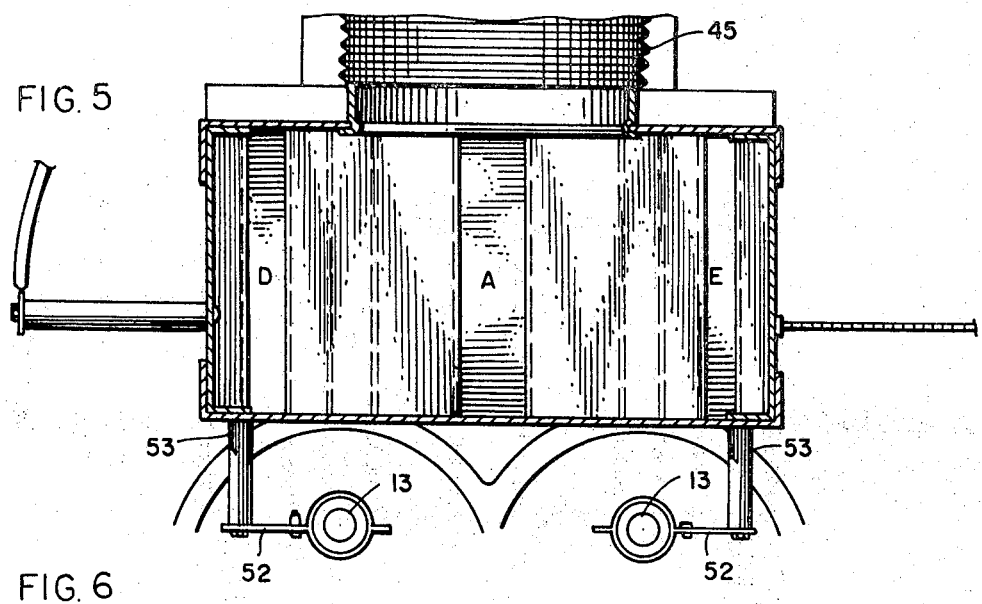
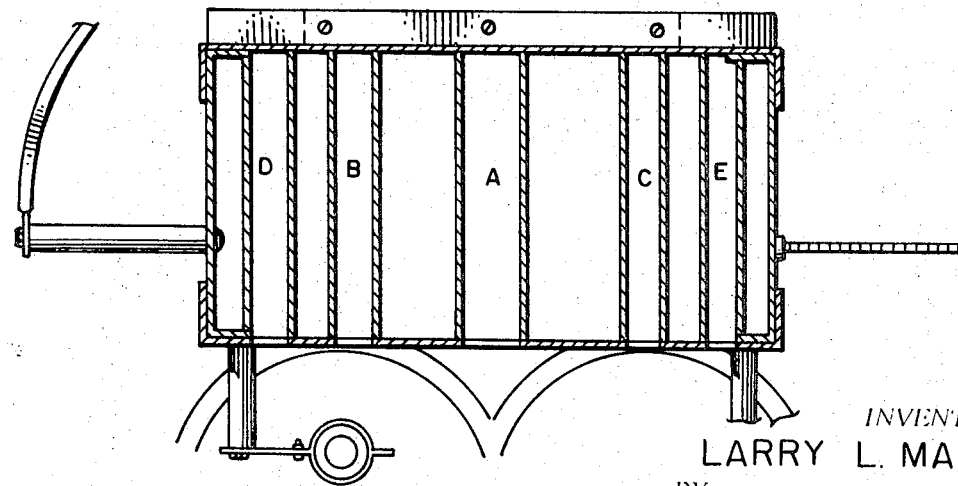

HIGH INTENSITY LIGHT CURING APPARATUS

Filed March 20, 1969          6 Sheets-Sheet 4

INVENTOR:
LARRY L. MARTIN
BY
Johnston, Root, O'Keeffe, Keil, Thompson & Shurtleff
ATT'YS

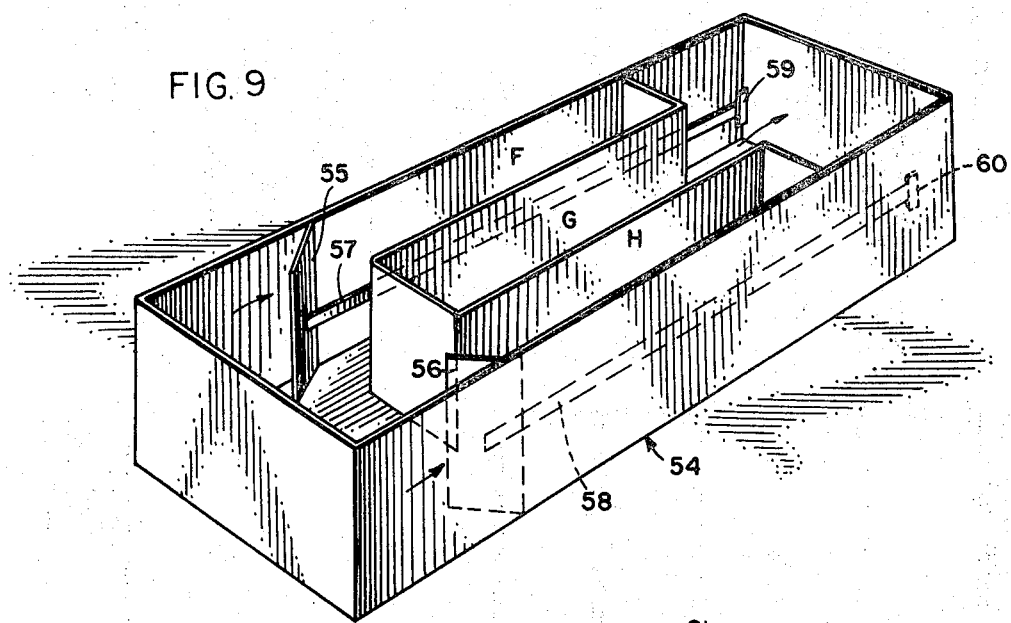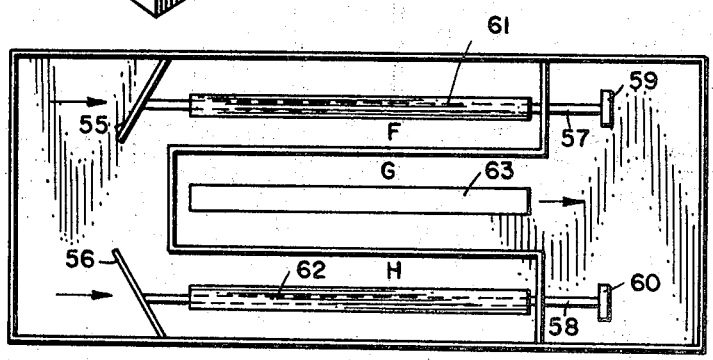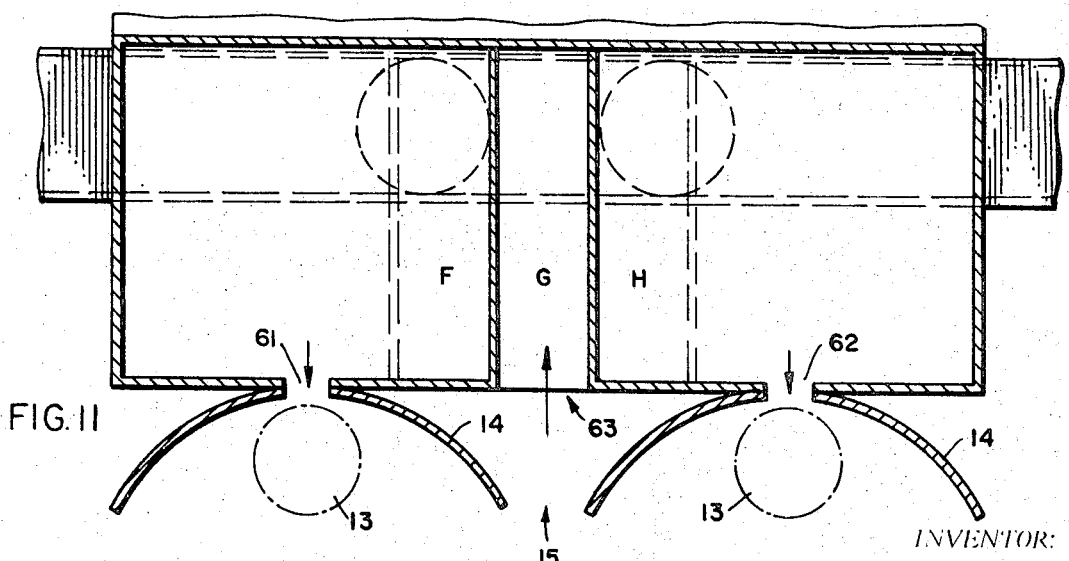

Feb. 23, 1971　　　　　L. L. MARTIN　　　　　3,564,728
HIGH INTENSITY LIGHT CURING APPARATUS
Filed March 20, 1969　　　　　　　　　　　6 Sheets-Sheet 6
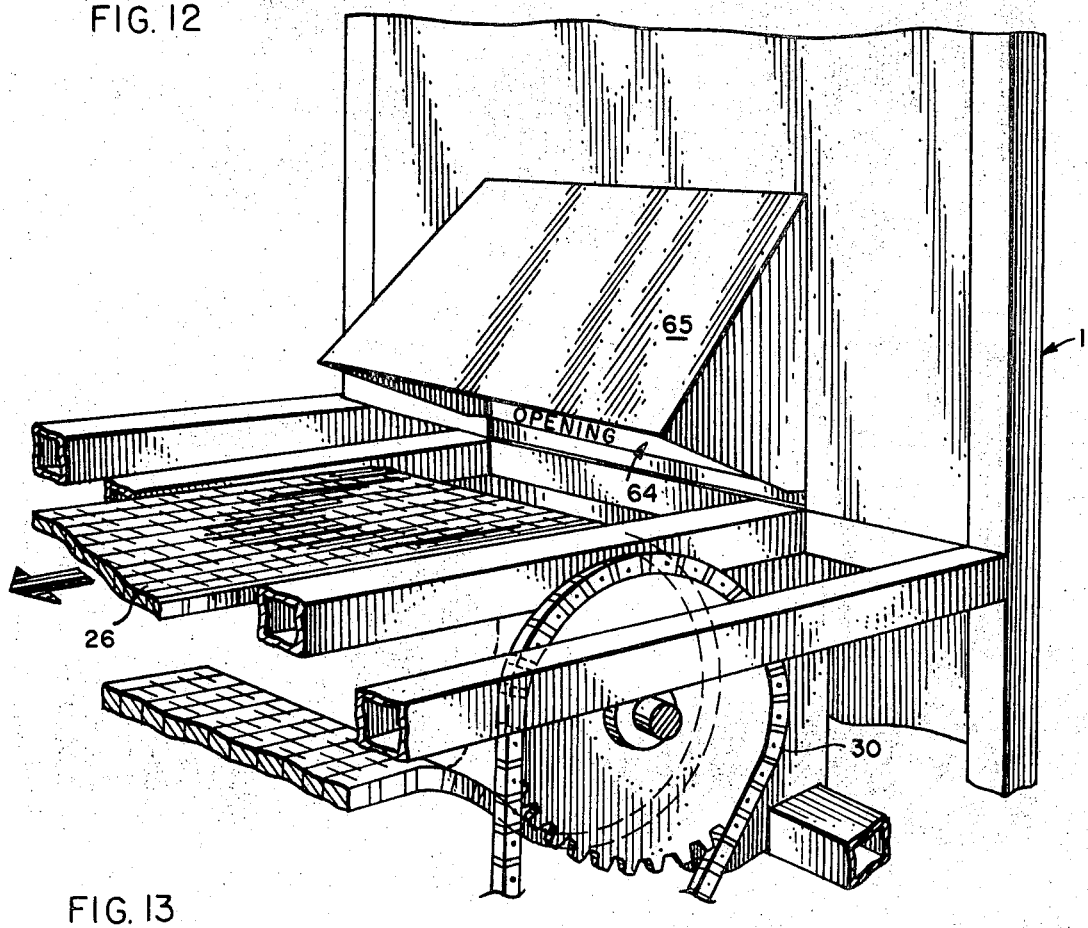
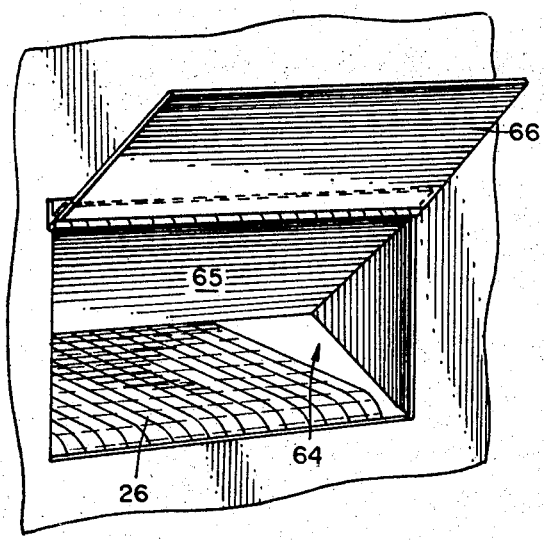
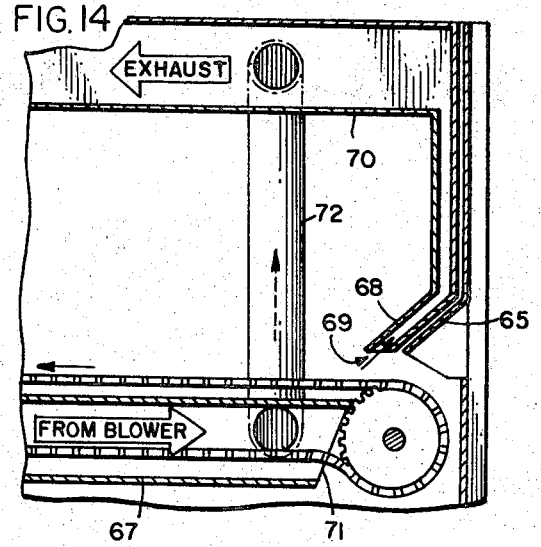
INVENTOR:
LARRY L. MARTIN
BY
Johnston, Root, O'Keeffe, Keil, Thompson & Shurtleff
ATT'YS

United States Patent Office 3,564,728
Patented Feb. 23, 1971

---

3,564,728
HIGH INTENSITY LIGHT CURING APPARATUS
Larry L. Martin, Park Forest, Ill., assignor to The Sherwin-Williams Company, Cleveland, Ohio, a corporation of Ohio
Filed Mar. 20, 1969, Ser. No. 808,752
Int. Cl. F26b *19/00*
U.S. Cl. 34—236        7 Claims

ABSTRACT OF THE DISCLOSURE

A high intensity light curing apparatus is provided comprising, in combination, a support adapted to support articles coated with a composition capable of being cured by exposure to high intensity light, high intensity light curing means comprising at least one high intensity light emitting tube, said tube having a reflector associated therewith adapted to reflect high intensity light from said tube to an article carried by said support, and means for forcibly circulating air between said tube and its associated reflector. In a preferred embodiment, the tubes are disposed in pairs with each tube having a reflector associated therewith, said reflectors each being curved on each side of its respective tube and being separated from one another between said tubes by an air space, with the provision of means for circulating air through an opening above each of said tubes as well as said space between the reflectors. Means are also provided for controlling the air flow, for changing the position of the tubes and reflectors with respect to the article support and for withdrawing gases and vapors from a point adjacent the surface of the article support.

THE PRIOR ART

It is known that coatings of some polymers can be photopolymerized to cure the polymers after the coatings have been applied to an article by subjecting such coatings to ultraviolet light. So far as is known, there has been very little, if any, commercial use of such processes and the apparatus for utilizing them has been mainly employed on a laboratory scale.

OBJECTS

One of the objects of this invention is to provide a new and useful high intensity light curing apparatus which can be employed commercially for curing coatings of polymers and which is particularly well adapted for curing coatings on plywood panels or other similar articles.

Another object of the invention is to provide an apparatus in module form so that additional modules can be added if necessary or desirable.

Still a further object of the invention is to provide a high intensity light curing apparatus in which an article such as plywood having a photopolymerizable coating thereon is exposed to high intensity light curing means provided by high intensity light emitting tubes, each of said tubes having a reflector associated therewith adapted to reflect high intensity light from said tube to said article, with the further provision of means for forcibly circulating air between each of said tubes and its associated reflector.

A further object of the invention is to provide an apparatus of the type described in which the articles are carried on a movable carrier.

Another object of the invention is to provide an apparatus of the type described in which the position of the tube and its associated reflector with respect to said article support can be readily changed.

Still another object of the invention is to provide an apparatus of the type described in which means are provided for readily controlling the amount of air flow to the tubes and their associated reflectors.

An additional object of the invention is to provide an apparatus of the type described having means for withdrawing gases and vapors from a point adjacent the article support.

Other objects and advantages of the invention will appear from the following description in conjunction with the accompanying drawings in which:

FIG. 1 is an elevational view with some parts removed of an apparatus embodying the invention;

FIG. 1A is a partial elevational view of a modification of one part of the apparatus shown in FIG. 1;

FIG. 1B is a small scale plan view of the apparatus shown in FIG. 1 with the doors thereon and partially opened;

FIG. 2 is a right profile or end view of the apparatus shown in FIG. 1 taken along the line 2—2 of FIG. 1;

FIG. 3 is a cross sectional view with parts broken away taken along the line 3—3 of FIG. 1;

FIG. 4 is a cross sectional view taken along the line 4—4 of FIG. 3;

FIG. 5 is a cross sectional view taken along the line 5—5 of FIG. 3;

FIG. 6 is a cross sectional view taken along the line 6—6 of FIG. 3;

FIG. 9 is a perspective view of another form of air circulating system employed in the practice of the invention;

FIG. 10 is a plan view of the portion of the apparatus shown in FIG. 9;

FIG. 11 is a cross sectional view of another form of air circulating system employed in the practice of the invention;

FIG. 12 is a view with parts broken away of the receiving end of the conveyor system;

FIG. 13 is a view with parts broken away of the outside opening through which articles are introduced into the conveyor system for processing; and FIG. 14 is a cross sectional view with parts broken away of a portion of the apparatus adapted for the withdrawal of gases and vapors from the surface of the conveyor system.

GENERAL DESCRIPTION OF THE INVENTION

Figure 7:
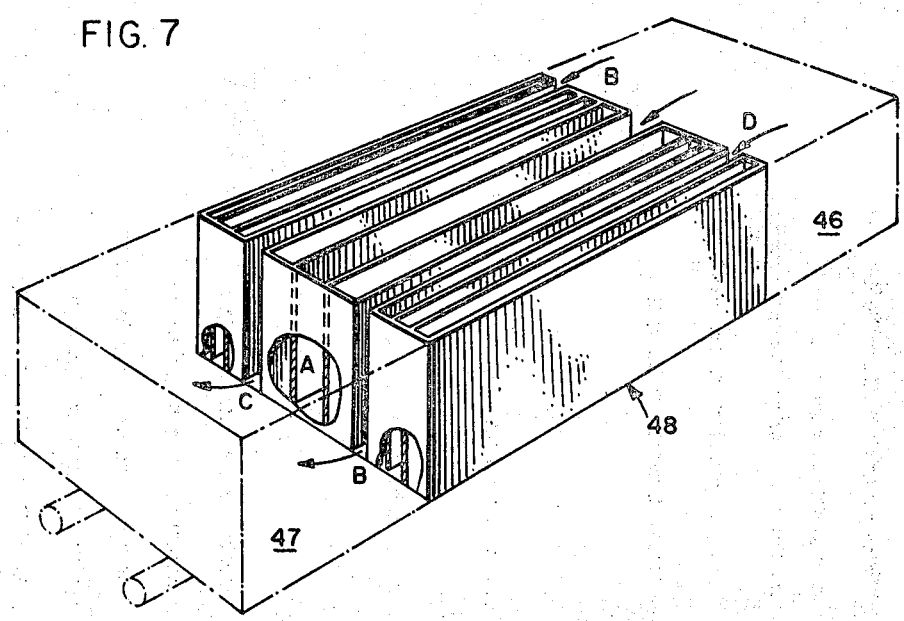
FIG. 7 is a perspective view of a part of the air circulating system shown in FIG. 4.

In accordance with the invention a high intensity light curing apparatus is provided which comprises, in combination, a support adapted to support articles coated with a composition capable of being cured by exposure to high intensity light, high intensity light curing means comprising at least one high intensity light emitting tube, said tube having a reflector associated therewith adapted to reflect high intensity light from said tube to an article carried by said support, and means for forcibly circulating air between said tube and its associated reflector.

The apparatus preferably comprises a plurality of high intensity light emitting tubes disposed in pairs with each tube having a reflector associated therewith and said reflectors each being curved on either side of its respective tube and being separated from one another between said tubes by an air space, and means for circulating air through an opening above each of said tubes and through said space between said reflectors.

In addition, the apparatus preferably comprises in a forced air circulating system a housing above each pair of high intensity light emitting tubes provided with a passageway for the flow of air, a movable baffle in said passageway and means for controlling the movement of said baffle to adjust the amount of air flow.

For most purposes the article support is preferably a movable conveyor as shown in the drawings. This type of article support is especially advantageous where the article is a plywood panel having its surface coated with a photopolymerizable polymer.

A further feature of the invention is the provision of an apparatus in which the position of the light emitting tubes and their associated reflectors can be changed with respect to the article support or conveyor.

Still a further preferred embodiment of the invention is the provision of means for withdrawing gases and vapors from a point adjacent the article support.

As shown in FIG. 1, the apparatus illustrated comprises frame 1 of generally rectangular shape and also second frame 2 of generally rectangular shape, each frame constituting a module and being joined together in any suitable manner at 3. Each of the frames 1 and 2 has a door 4 and 5, respectively, as shown in FIG. 1B, which doors are normally closed when the apparatus is in operation so as to shield the operator from the intense light. To facilitate describing the invention these doors have not been shown except in FIG.1B. It will be understood that a portion of the power equipment used for operating the light emitting tubes can be and normally is carried in doors 4 and 5 but this will not be described in detail because it is not a part of the invention.

Another portion of the power equipment for operating the light emitting tubes is supported by the base members 6 and 7 of the frames 1 and 2 and is generally indicated by the numerals 8, 9, 10, 11 and 12 but no detailed description of these portions of the apparatus is necessary for an understanding of the invention claimed herein.

Figure 8:
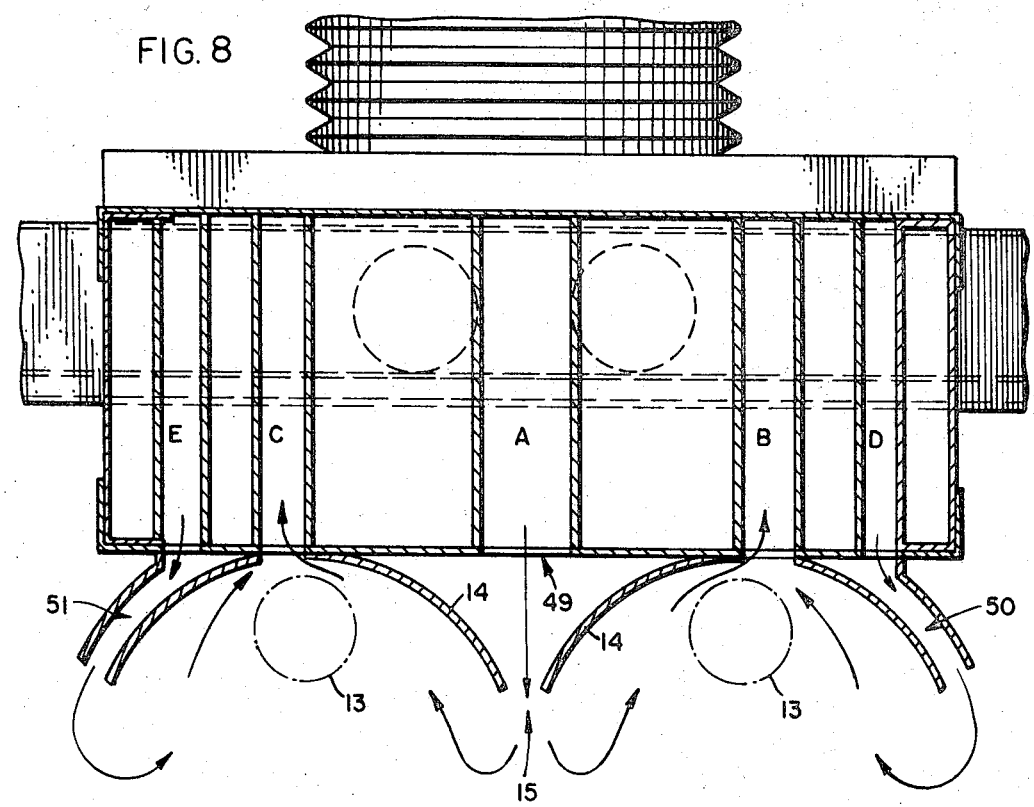
FIG. 8 is an enlarged cross sectional view of one form of air circulating system employed in the practice of the invention.

The light emitting tubes 13 each has associated therewith a reflector 14, each reflector being curved on either side of its respective tube and the reflectors being supported from each other between said tubes by an air space 15 as shown, for example, in FIG. 8. In the embodiment of the invention illustrated in the drawings, the tubes 13 extend transversely and are supported from a housing 16 which is divided into air pasageways as hereinafter more fully described. The housing 16 is secured to a movable bar 17 which is supported on opposite ends by chains 18 and 19. The chains 18 and 19 are attached to drums 20 and 21 which can be rotated by turning handles 22 and 23 and thereby raise and lower the bar 17 and the other members associated therewith to any desired position. This makes it possible to vary the light intensity and coverage to compensate for different types of photopolymerizable chemical coatings. Instead of a manual operation, the bar 17 and its associated equipment can be raised and lowered by using motors 24 mounted on opposite ends of the support 25 with shafts arranged transversely (see FIG. 1A). The motors can be arranged to operate separately or in synchronism. Regardless of whether a manual operation or motor actuation is used, the bar 17 with its associated equipment can be raised or lowered so that all of the tubes 13 are approximately the same distance from the conveyor belt 26 or, if desired, by raising the bar 17 with one end higher than the other. The position of the light emitting tubes with respect to the conveyor can be varied. This makes it possible to provide a more intense light treatment in the earlier stages and a less intense treatment in the later stages, or vice versa.

Referring to FIGS. 1 and 3, the conveyor 26 is driven by a motor 27 through sprockets 28 and 29 connected by chain 30. The sprocket 29 drives shaft 31 which is mounted in support member 32 and connected to driving roller 33. The conveyor belt 26 is supported at the opposite end by roller 34 and at intermediate points by idler rollers 35 and 36.

Optionally, metal plates 37 can be screwed between frame members 25 and 38 in order to render the high intensity light emited by tubes 13 invisible to the operator from the side of the apparatus.

The air circulation system which is an essential part of the apparatus comprises a blower 39 which can be operated either to blow air into the system or as an exhaust fan. In either case the blower 39 is connected by means of a hollow flexible tube 40 to duct 41. Other flexible tubes 42, 43, 44 and 45 are connected to the housing 16 and either introduce or exhaust air from passageways 46 and 47 as shown in FIG. 3. The housing 16 has an inner chamber 48 which provides a series of air passageways as shown in FIG. 4 which communicate with the passageways 46 and 47.

In the embodiment of the invention shown in FIGS. 4, 5, 6, 7 and 8, the air passageways in the inner chamber 48 are designated by the letters A, B, C, D and E. The path of air flow is illustrated by the arrows. Referring to FIG. 8 it will be seen that the air flows downwardly through passageway A and opening 49 around the top of reflectors 14 and thence upwardly over the tubes 13, 13 to passageways B and C. A portion of the air also flows through passageways D and E into passageways 50 and 51 to cool the external portions of reflectors 14. This air likewise flows upwardly into passageways B and C and is exhausted through duct 47 (FIG. 4).

As shown by FIG. 5 tubes 13 are supported by means of brackets 52, 52 attached to suitable supporting members 53, 53. Electric current for operation of the tubes 13, 13 is supplied from any suitable source, not shown.

A modification of the air circulation system is illustrated in FIGS. 9, 10, and 11 wherein the inner chamber generally shown at 54 is divided into three passageways F, G and H. Air is blown into passageways F and H and the amount of air is controlled by baffles 55 and 56 which are hinged to the sides of the chamber 54 and moved back and forth by means of control rods 57 and 58. The control rods 57 and 58 are operated manually from the ends thereof at 59 and 60. As shown in FIGS. 10 and 11, the air which is forced into passageways F and H passes downwardly through slots or openings 61 and 62 around tubes 13 and then upwardly through the space 15 between reflectors 14, 14 through slot 63 into passageway G.

The receiving end of the apparatus as shown in FIGS. 12, 13 and 14 has an opening 64 which is partially covered by an inner shield 65 which permits the passage of an article to be treated, for example, a plywood panel, but shields the operator's eyes from the light emitted by the tubes 13. Optionally, an outer shield 66 is provided which can be used to close the opening 64 after the article has been inserted into the opening and placed on the conveyor belt 26.

In the modification shown in FIG. 14 an air circulation system is provided adjacent the receiving end of the apparatus to remove gases and vapors which are generated as the result of evaporation of solvents or because of photopolymerization reactions. This system comprises a duct 67 into which air is introduced from any source, not shown, a second duct 68 having an opening 69 and an exhaust duct 70. Duct 67 is closed at end 71 causing the circulating air to pass through duct 72 thereby creating a suction effect through opening 69.

It will be recognized that a number of variations may be made in the apparatus described without departing from the invention. Thus, the width of the apparatus can be varied in accordance with the particular article to be treated. In the apparatus shown, the conveyor belt is about one foot wide but in an apparatus for treating plywood panels the belt would be four feet wide and the receiving opening would be large enough to accommodate such panel. Similarly, the length of the high intensity light emitting tubes can vary but the tubes will ordinarily be from one foot to four feet long. The tubes are normally disposed transversely with respect to the conveyor belt as shown in the drawings but can also be disposed longitudinally. Normally, high intensity light emitting tubes which transmit large quantities of ultraviolet light are employed for the purpose of the invention but the apparatus can also be used with tubes that transmit other types of light. The length of the reflectors associated with the tubes should be commensurate with the length of the tubes. The spacing of the light emitting tubes is subject to variation but is usually within the range of 8 to 14 inches in each unit comprising a pair of said tubes. The units 16 are movable longitudinally on the supporting bars 17 and the spacing of the units can be varied either to provide uniform or non-uniform distribution of light.

The air circulation openings above the light emitting tubes are normally off-set laterally, as shown in the drawings, but the positioning of these openings can be varied somewhat. Other modifications within the scope of the invention will readily be recognized by those skilled in the art.

The invention is hereby claimed as follows:

1. High intensity light curing apparatus comprising, in combination, a support adapted to support articles coated with a composition capable of being cured by exposure to high intensity light containing ultraviolet light, high intensity light curing means comprising at least one high intensity light emitting tube capable of emitting ultraviolet light, said tube having a reflector associated therewith adapted to reflect said high intensity light from said tube to an article carried by said support, means forming an opening in said reflector above and adjacent said tube, and means for forcibly circulating air through said opening whereby said air passes between said tube and its associated reflector.

2. An apparatus as claimed in claim 1 having a plurality of said tubes disposed in pairs with each tube having a reflector associated therewith, said reflectors each being curved on either side of its respective tube and being separated from one another between said tubes by an air space, and means for circulating air through said opening above each of said tubes and through said space between said reflectors.

3. An apparatus as claimed in claim 1 in which said means for forcibly circulating air comprises a housing above said tube provided with a passageway for the flow of said air to said opening, a movable baffle in said passageway, and means for controlling the movement of said baffle to adjust the amount of air flow.

4. An apparatus as claimed in claim 1 in which said article support is a movable conveyor.

5. An apparatus as claimed in claim 1 comprising means for changing the position vertically of said tube and its associated reflector with respect to said article support.

6. An apparatus as claimed in claim 1 which also comprises a housing adjacent said article support, said housing being provided with a passageway having an opening adjacent the inlet surface of said support, and means connected to said passageway for withdrawing gases and vapors through said opening.

7. In an apparatus for curing a photopolymerizable coating on a wooden panel, the combination of, a supporting conveyor adapted to support a wooden panel, said conveyor being adapted to move with said panel supported thereon in a generally horizontal position, a housing enclosing said conveyor, supporting means within said housing supported therefrom and extending lengthwise above said conveyor, said supporting means being movable vertically or at an angle with respect to said conveyor, a plurality of high intensity light emitting tubes capable of emitting ultraviolet light mounted transversely with respect to said supporting means, said tubes each having a curved reflector associated therewith adapted to reflect said high intensity light from said tube to said coated panel carried by said conveyor, means forming an opening extending transversely in each of said reflectors above and adjacent each said tube, means forming a passageway running in the same general direction above said conveyor, means for circulating air into said passageway, and means for connecting said passageway to each of said openings in said reflectors whereby said circulating air can pass through said openings between each of said tubes and its associated reflectors.

References Cited

UNITED STATES PATENTS

| | | | |
|---|---|---|---|
| 1,463,923 | 8/1923 | Nelson | 34—155 |
| 2,308,239 | 1/1943 | Bell | 34—161 |
| 2,848,821 | 8/1958 | Clark et al. | 34—162 |
| 2,360,257 | 10/1944 | Muller et al. | 34—39 |
| 3,187,162 | 6/1965 | Hojo et al. | 34—41X |
| 3,824,922 | 11/1966 | Goldenberg | 34—156 |

EDWARD J. MICHAEL, Primary Examiner

PO-1050
(5/69)

UNITED STATES PATENT OFFICE
CERTIFICATE OF CORRECTION

Patent No. 3,564,728      Dated February 23, 1971

Inventor(s) Larry L. Martin

It is certified that error appears in the above-identified patent and that said Letters Patent are hereby corrected as shown below:

Column 6, line 43, in the references, "3,824,922" should read -- 3,284,922 --.

Signed and sealed this 17th day of August 1971.

(SEAL)
Attest:

EDWARD M. FLETCHER, JR.
Attesting Officer

WILLIAM E. SCHUYLER, JR.
Commissioner of Patents